United States Patent [19]

Smith

[11] Patent Number: 4,684,157

[45] Date of Patent: Aug. 4, 1987

[54] HOSE COUPLING

[75] Inventor: Richard D. Smith, Yorkshire, England

[73] Assignee: Internationale Octrooi Maatschappij "Octropa" BV, Netherlands

[21] Appl. No.: 363,529

[22] Filed: Mar. 30, 1982

[30] Foreign Application Priority Data

Mar. 30, 1981 [GB] United Kingdom ............... 8109882
Jan. 11, 1982 [GB] United Kingdom ............... 8200646

[51] Int. Cl.⁴ ........................................... F16L 33/20
[52] U.S. Cl. .................................. 285/256; 285/259
[58] Field of Search ............................. 285/256, 259

[56] References Cited

U.S. PATENT DOCUMENTS 2,430,921 11/1947 Edelmann ...................... 285/256 X
3,512,810 5/1970 Harris ................................. 285/256
3,549,180 12/1970 MacWilliam ..................... 285/256

FOREIGN PATENT DOCUMENTS 2626608 12/1976 Fed. Rep. of Germany ...... 285/256
2046388 11/1980 United Kingdom .

Primary Examiner—Thomas F. Callaghan
Attorney, Agent, or Firm—Cushman, Darby & Cushman

[57] ABSTRACT

A hose coupling in which an insert is insertable within the end of the hose and a ferrule is swaged radially around the hose to grip the hose between the ferrule and insert is adapted to accommodate different hoses of the same nominal bore while having a stop member on the ferrule to contact an abutment on the insert and provide relative location therebetween before swaging, the stop member being collapsible on swaging to prevent the insert being crushed. A hose stop may also be provided to position the end of the hose with the coupling.

4 Claims, 5 Drawing Figures

HOSE COUPLING

This invention relates to a hose coupling ferrule which is compressed by swaging to secure an insert within the end of a hose by gripping the end of the hose between the ferrule and the insert.

Before a ferrule is swaged it is necessary to position the ferrule and insert correctly relative to one another and preferably to the end of the hose in the longitudinal direction of the hose. It has been proposed to effect such relative location by providing an inwardly extending annular rib on the inner surface of the ferrule, the hose extending into a first end of the ferrule to the extent that the end face of the hose is abutted against the rib to urge an inwardly extending lip at the opposite, second end of the ferrule into contact with a radial shoulder formed by one side of a recess on the insert into which recess the lip is subsequently swaged to positively lock the ferrule and insert together.

Thus the ferrule is located longitudinally relative to the end face of the hose and relative to the insert prior to swaging. The distance that the second end of the ferrule can be swaged inwards is however limited by the height of the shoulder on the insert. If the second end of the ferrule is swaged a radial distance more than the height of the shoulder then the insert will be collapsed at the base of the shoulder. If a ferrule is designed for a specific hose wall construction and thickness such bore collapse can be prevented but to avoid an undue multiplicity of ferrule designs it is desirable that a single ferrule will be suitable for more than one type of hose of the same nominal bore. It is also desirable to use a common insert with as many types of hose as possible, again to avoid a multiplicity of inserts.

According to the present invention there is provided a hose coupling ferrule adapted to be swaged to secure an insert within the end of a hose comprising an annular sleeve having at a first end an inner surface which receives the hose end before swaging and a thin collapsible stop member extending radially inwards from said inner surface, one side of the stop member engageable with an abutment on the insert to position the ferrule in the longitudinal direction relative to the insert, swaging of the ferrule collapsing the stop member without crushing the insert.

No other contact between the ferrule and insert is necessary before swaging and all other dimensions of the ferrule can therefore be chosen having regard to the type of hose and the distance by which the ferrule is to be swaged to provide the necessary grip.

The collapsible stop member can conveniently comprise a hose stop the other side of which is engageable by the end face of the hose. Thus the collapsible stop member is sandwiched between the end face of the hose and the abutment on the insert and alone locates the ferrule and hose relative to the insert.

The ferrule preferably has a radially inwardly extending lip member at the second end of the sleeve opposite the first end and adapted to be swaged into a recess in the insert. This positively anchors the ferrule and insert together preventing the ferrule from moving relative to the insert and enhancing the grip of the coupling on the end of the hose. The radial distance of the lip member away from the base of the recess before swaging can be chosen to eliminate any possibility of the lip collapsing the insert during swaging.

According to another aspect of the present invention the hose coupling ferrule can be provided with a radially inwardly extending lip member at the second end of the sleeve opposite the first end and adapted to be swaged into a recess on the insert, the collapsible stop member extending radially inwardly from the end of the lip member remote from the first end of the sleeve. One side of the collapsible stop member engages with an abutment formed by a side face of the recess on the insert before swaging to effect relative longitudinal positioning of the ferrule and insert with the lip aligned with the recess in the insert. The risk of crushing the bore of the insert at the base of the recess can however be minimised since the distance between the lip and the base of the recess can be adapted to the maximum distance the ferrule has to be swaged inwards whilst the collapsible stop is deformed to lie within the recess without crushing the insert. Providing the collapsible stop at the end of the ferrule avoids any necessity for forming a deep undercut adjacent the collapsible stop which may unduly increase the manufacturing machine time and hence the cost.

Preferably the ferrule is provided with a hose stop extending radially inwardly from the inner surface, one side of which is engageable by the end of the hose. The collapsible stop on the ferrule can be urged into engagement with the side face of the recess in the insert by the end of the hose. Thus the ferrule, insert and hose can all be correctly positioned relative to one another before swaging.

To enhance the grip of the ferrule on the hose a plurality of inwardly extending ribs are preferably provided on the inner surface of the ferrule to penetrate the hose, particularly when the ferrule is intended for use with hoses having either one or two layers of wire reinforcement therein, the hose not being skived to expose the reinforcement before the ferrule is swaged into position, a single ferrule being suitable for both hoses of a given nominal bore dimension.

The invention also provides a hose coupling comprising an insert insertable into a hose end and a ferrule radially swageable around the hose to grip the hose between the insert and the ferrule, an annular recess on the insert being engaged by a radially inwardly extending lip member on the ferrule as the ferrule is swaged, and a radially inwardly extending annular collapsible stop member on the ferrule one radial face of the-stop being adapted to contact a radially outwardly extending abutment on the insert to locate the ferrule relative to the insert in the longitudinal direction and a radially inwardly extending hose stop on the ferrule being adapted to be contacted by the radial end face of the hose to maintain the aforesaid location prior to swaging, the abutment on the insert extending radially outward by a distance less than the radial distance through which the ferrule is compressed by swaging. As the ferrule is swaged the internal bore of the stop member contacts the outer diameter of the insert adjacent the abutment before the swaging is completed. The stop member therefore collapses against the insert without effecting collapse of the bore of the insert.

The collapsible stop member can comprise the hose stop and preferably the internal bore of the stop member prior to swaging substantially corresponds to the outer surface of the insert adjacent the abutment. This locates the ferrule radially relative to the insert prior to swaging and is particularly convenient when the inner surface of the ferrule prior to swaging exceeds the outer diameter of the end of the hose.

Alternatively the annular recess on the insert can be defined between two radial faces of unequal height the smaller of which is adjacent that part of the insert insertable into a hose, and the lip on the ferrule being larger in diameter than the maximum diameters of either of the faces of the recess, the collapsible stop extending inwardly from the ferrule lip and having a height to pass over the smaller face of the recess and abut with the larger face of the recess to align the lip with the recess before swaging.

The invention will now be more particularly described with reference to the accompanying diagrammatic drawings in which FIG. 1 is a longitudinal view, partially cross-sectioned, of a hose coupling prior to swaging as previously used;

Figure 1:
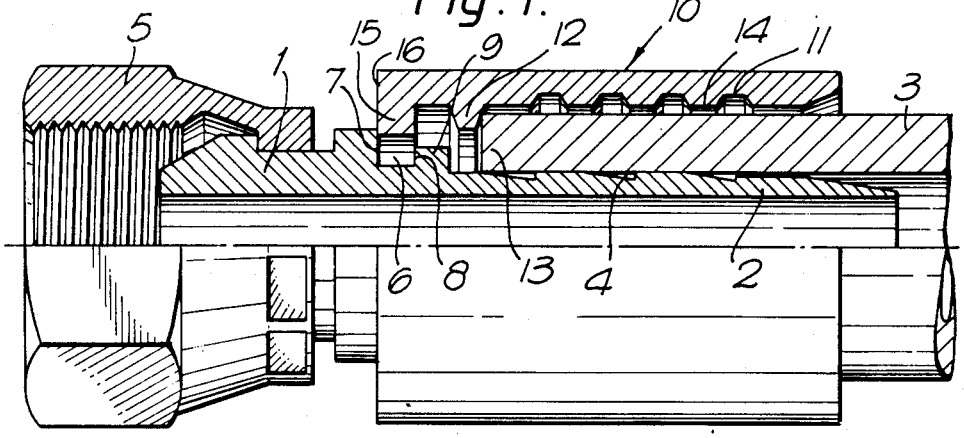

Referring to FIG. 1 there is shown an insert 1 having at one end a portion 2 for fitting within the end of hose 3. The portion 2 is provided with a number of circumferential serrations 4 to enhance the grip between the insert and the bore of the hose. The other end of the insert as shown is provided with a captive nut 5 but it will be well understood that a number of different terminations are possible.

The insert is provided with an annular recess 6 one side face of which is formed by a radial shoulder 7 and the other side by a radial side face 8 on one side of an annular flange 9.

A ferrule 10 has an inner surface 11 which is provided with an inwardly extending annular rib 12 and the hose 3 can be inserted into a first end of the ferrule until the radial end face 13 of the hose abuts the rib 12. The inner surface of the first end of the ferrule comprises gripping members 14 which enhance the grip of the ferrule on the hose.

At the opposite, second, end of the ferrule there is an inwardly extending lip 15 which enters the recess 6 in the insert when the ferrule is swaged.

Prior to swaging the relative location of the ferrule, insert and hose in the longitudinal direction is determined by the engagement of the end face 16 of the second end of the ferrule, more particularly the lip member 15, with the radial shoulder 7, this engagement being maintained by the end face 13 of the hose abutting the rib 12.

Whilst the ferrule is prevented from moving in the longitudinal direction relative to the hose and insert the radial distance that the ferrule can be inwardly compressed by swaging is limited to slightly less than the radial height of the shoulder 7. Swaging a greater amount will cause the lip 15 to collapse the insert. When a ferrule is required to be suitable for different hoses having different wall thicknesses or different constructions a different swaging distance can be required for one or more of the different hoses, which swaging distance may be greater than the radial height of shoulder 7 of a standard insert.

The height of the shoulder 7 could of course be increased but that would increase the overall size of the insert and add to the cost of the insert. Such an increase in cost would be particularly undesirable when the insert is used with other ferrules not requiring the shoulder height and producing two types of insert with a variation of only the shoulder height would lead to a costly multiplication of inserts. Furthermore some ferrules which can be used with the insert as shown are swaged down to a diameter approaching that of the outside of the shoulder 7. Any increase in the height of the shoulder would lead to difficulties in swaging such ferrules since they would have to be swaged down to a diameter equal to or less than the outside diameter of the shoulder.

It will also be well understood that increasing the inner diameter of the lip 15 would result in instances occurring in which the lip is not properly engaged in the recess 6 leading to the hose blowing out of the coupling prematurely in service.

Figure 2:
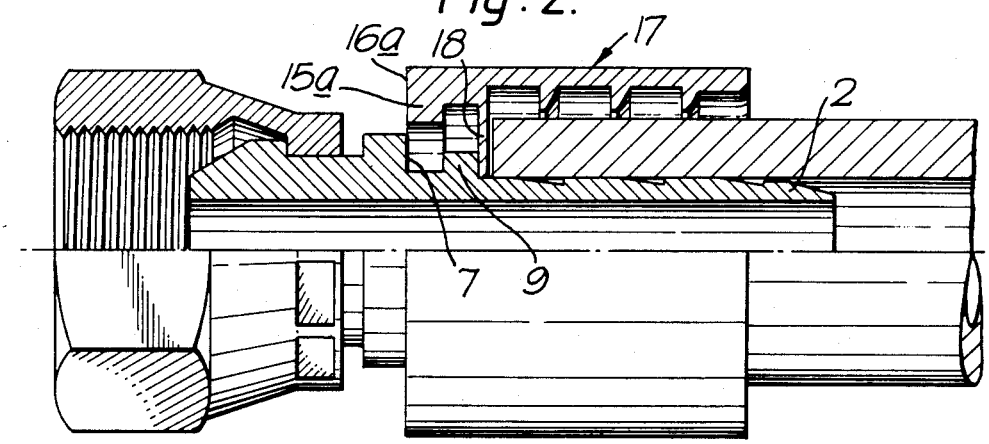
FIG. 2 is a longitudinal view, partially cross-sectioned, of a ferrule and hose coupling according to one embodiment of the invention prior to swaging.

Referring now to FIG. 2 there is shown an insert 1 as shown in FIG. 1. The ferrule 17 is provided with a radially inwardly extending collapsible stop member 18 which as shown is sandwiched between the end face 13 of the hose and the annular flange 9 of the insert which forms an abutment. The ferrule is thereby located in the longitudinal direction by the stop member. The end face 16a of the ferrule is no longer required to contact the shoulder 7 on the insert prior to swaging and as shown in FIG. 2 the inner diameter of the lip 15a can exceed the largest diameter of the shoulder 7.

The ferrule is swaged onto the end of the hose by radial compression. During swaging the stop member 18 engages the insert 2 and collapses and folds around the outside thereof to lie below the hose 3 as shown at 18a. The thickness of the stop member is chosen to collapse in this way without the insert being collapsed.

Figure 3:
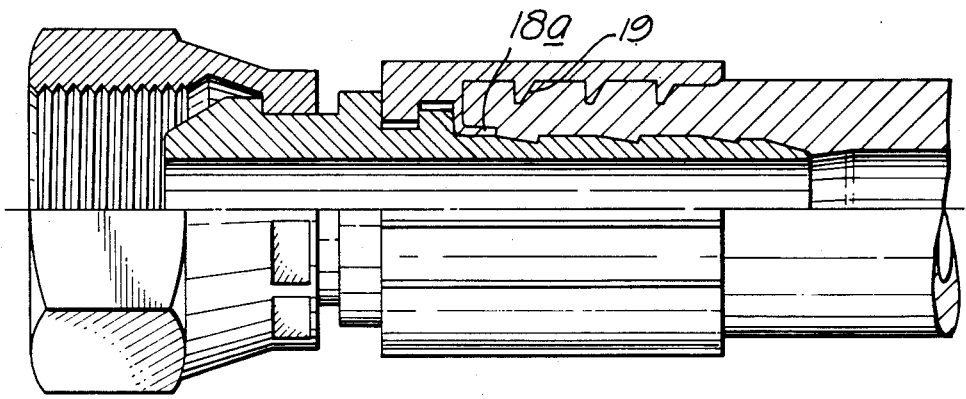
FIG. 3 is a view similar to FIG. 2 after the ferrule has been swaged.

The ferrule is particularly suitable for use with so-called thin cover hoses having either one of two layers of wire reinforcement therein. For such type of hose the ferrule is provided with teeth 19 on its inner surface which penetrate the thin covering of the hose as shown in FIG. 3 and engage the wire reinforcement to positively grip the hose. Although the outer diameter of one and two wire thin cover hose is different for hose of the same nominal bore size a single ferrule which accommodates both types of hose of one nominal size has been found to be capable of successfully being swaged as shown.

When the outer diameter of the hose is smaller than the maximum diameter hose which the ferrule can accommodate there can be radial movement of the ferrule relative to the insert. To avoid this it is preferable that the inner diameter of the collapsible stop member 18 is substantially that of the outside of the insert.

Whilst the stop member 18 has been described and illustrated as annular it will be appreciated that the stop member can be radially interrupted to provide the required degree of collapsibility of the stop member during swaging.

Depending upon the manner of manufacturing the ferrule shown in FIGS. 2 and 3 the radial height of the collapsible stop member 18 can require relatively awkward and time consuming machining operations which would add unduly to the cost of the ferrules.

Figure 4:
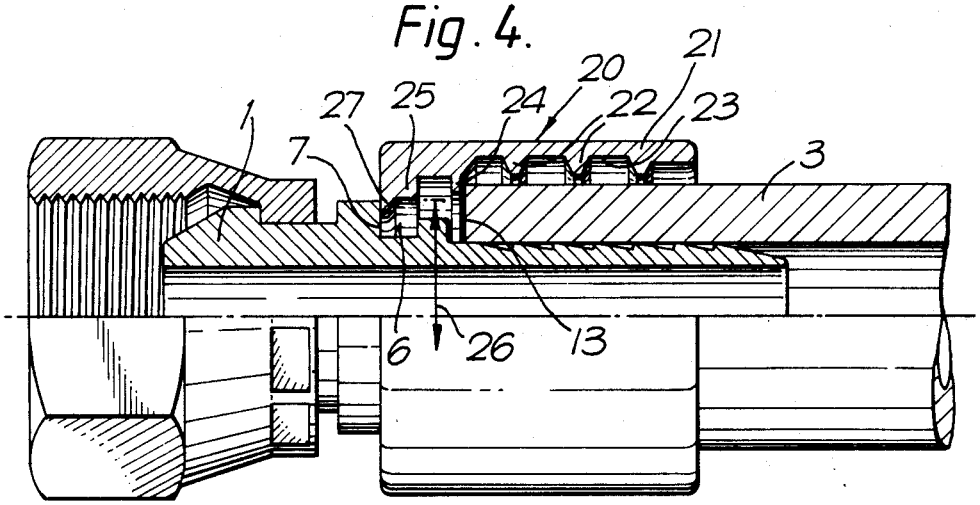
FIG. 4 is a view similar to FIGS. 1 and 2 of a ferrule and hose coupling according to another embodiment of the present invention.
Figure 5:
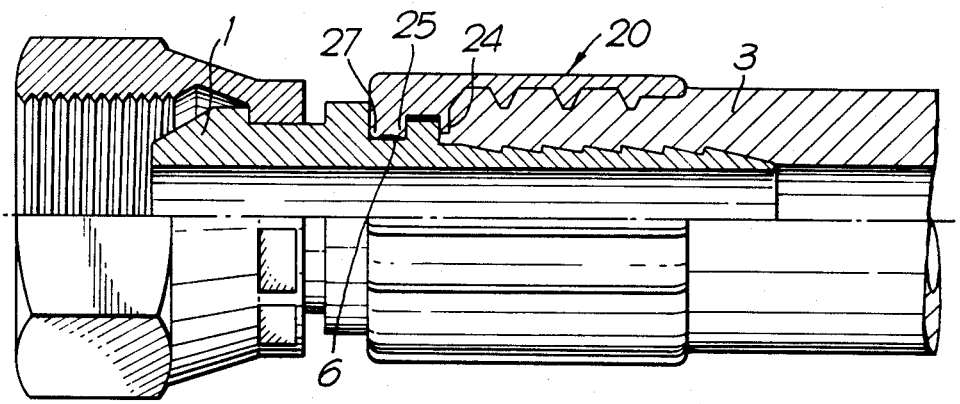
FIG. 5 is a partially cross-sectioned longitudinal view of the hose coupling of FIG. 4 after the ferrule has been swaged.

Referring now to FIG. 4 there is shown a ferrule 20 according to another embodiment of the present invention which avoids such time consuming machining and which is illustrated together with an insert 1 as shown in FIGS. 1-3. The ferrule comprises an annular sleeve having at a first end 21 an inner surface which receives, the end of the hose 3, a plurality of radially inwardly extending gripping members 22 being spaced apart on the internal surface 23. A hose stop 24 is provided one side of which is adapted to be contacted by the end face 13 of the hose 3.

At the other end of the ferrule is an inwardly extending annular lip 25 which is adapted to be swaged into the recess 6 on the insert. The inner diameter 26 of the lip 25 is greater than the maximum diameter of the side face 7 of the recess.

To align the lip 25 with the recess 6 collapsible stop 27 is formed on the lip to extend radially inwardly therefrom a distance sufficient to contact an abutment formed by the radial face 7 on the insert. The ferrule can be urged relative to the insert by the hose end 13 contacting the hose stop 24 to ensure contact between the lip 27 and the face 7 prior to swaging.

On swaging the stop 27 deforms within the recess 6 without collapsing the bore of the insert and without interfering with the engagement of the lip 25 in the recess as shown in FIG. 3.

Thus there is provided a ferrule and a hose coupling which can be manufactured economically and can be dimensioned to suit a number of different hoses of the same nominal bore and without the necessity of providing special inserts. The ferrule is particularly suitable for use with so-called thin cover hoses having either one or two wire reinforcement layers. Although the outer diameter of one and two wire thin cover hose is different for hose of the same nominal bore size a single ferrule which accommodates both types of hose of one nominal size has been successfully swaged as shown and proven to be capable of withstanding the usual testing without failure.

Whilst the stop 27 has been described and illustrated as annular it will be appreciated that the stop can be radially interrupted to increase the ease with which it will deform on swaging.

I claim:

1. A hose coupling comprising an insert insertable into a hose end and a ferrule radially swageable around the hose to grip the hose between the insert and the ferrule, an annular recess on the insert being engaged by a radially inwardly extending lip member on the ferrule as the ferrule is swaged, and a radially inwardly extending annular collapsible stop member on the ferrule, the inner diameter of the collapsible stop before swaging being less than the maximum diameter of a radially outwardly extending abutment on the insert to locate the ferrule longitudinally with respect to the insert, the difference between the inner diameter of the stop and the diameter of the insert adjacent the abutment being less than the difference in an outer ferrule diameter before and after swaging, and a radially inwardly extending hose stop on the ferrule being adapted to be contacted by the radial end face of the hose to maintain the aforesaid location prior to swaging.

2. A hose coupling according to claim 1 in which the collapsible stop member comprises the hose stop.

3. A hose coupling according to claim 2 in which the internal bore of the stop member prior to swaging substantially corresponds to the outer surface of the insert adjacent the abutment.

4. A hose coupling according to claim 1 in which the annular recess on the insert is defined between two radial faces of unequal height the smaller of which is adjacent that part of the insert insertable into a hose, and the lip on the ferrule is larger in diameter than the maximum diameters of either of the faces of the recess, the collapsible stop extending inwardly from the ferrule lip and having a height to pass over the smaller face of the recess and abut with the larger face of the recess to align the lip with the recess before swaging.

* * * * *